(12) United States Patent
Reeve

(10) Patent No.: US 6,599,970 B2
(45) Date of Patent: Jul. 29, 2003

(54) AQUEOUS COMPOSITIONS CONTAINING LIPOPHILICALLY-MODIFIED COPOLYMER THICKENERS

(75) Inventor: Paul Francis David Reeve, Valbonne (FR)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 09/870,160

(22) Filed: May 30, 2001

(65) Prior Publication Data

US 2002/0132917 A1 Sep. 19, 2002

Related U.S. Application Data

(63) Continuation-in-part of application No. 09/761,059, filed on Jan. 16, 2001, now abandoned.

(51) Int. Cl.$^7$ ............ C08K 5/06; C08L 31/02; C08L 33/02
(52) U.S. Cl. ............ 524/366; 524/368; 524/558; 524/832
(58) Field of Search ............ 524/558, 366, 524/368, 832

(56) References Cited

U.S. PATENT DOCUMENTS

| | | | |
|---|---|---|---|
| 4,384,096 A | | 5/1983 | Sonnabend |
| 4,429,097 A | | 1/1984 | Chang et al. |
| 4,514,552 A | | 4/1985 | Shay et al. |
| 4,552,685 A | * | 11/1985 | Kernstock et al. |
| 4,663,385 A | | 5/1987 | Chang et al. |
| 5,648,326 A | | 7/1997 | Sramek |
| 5,705,144 A | * | 1/1998 | Harding et al. |
| 5,889,092 A | * | 3/1999 | Grinstein et al. .............. 524/27 |
| 5,916,967 A | * | 6/1999 | Jones et al. .................. 524/732 |

FOREIGN PATENT DOCUMENTS

| | | | |
|---|---|---|---|
| EP | 0 039 128 | * | 11/1981 |
| EP | 595590 A2 | | 4/1994 |
| EP | 966955 A1 | | 12/1999 |
| WO | 9900470 | | 1/1999 |

OTHER PUBLICATIONS

Organic Chemistry, line 9, p. 253, Morrison and Boyd, 6$^{th}$ Ed, Prentice–Hall Inc.*

* cited by examiner

Primary Examiner—Tae H. Yoon
(74) Attorney, Agent, or Firm—Thomas J. Howell; Stephen E. Johnson

(57) ABSTRACT

Aqueous compositions having enhanced thickening properties containing lipophilically-modified copolymer thickeners and one or more hydrophilic surfactants are disclosed. In particular, aqueous compositions containing (i) lipophilically-modified copolymers containing at least 5% of selected lipophilically-modified components and (ii) surfactants having an HLB value of greater than 15 are useful for the thickening of a range of personal, domestic and industrial products.

8 Claims, No Drawings

AQUEOUS COMPOSITIONS CONTAINING LIPOPHILICALLY-MODIFIED COPOLYMER THICKENERS

BACKGROUND

This is a continuation-in-part application of copending U.S. application Ser. No. 09/761,059 filed Jan. 16, 2001 now abandoned. The latter copending application is hereby incorporated by reference.

This invention relates to thickeners for aqueous systems. More particularly, the invention relates to hydrophobically-modified thickeners and to their use in thickening aqueous systems.

There is a wide variety of commercial or industrial products in the form of thickened aqueous systems. Examples of such products are domestic or personal care products, such as detergents, shampoos, liquid soaps or cosmetic fluids, dentifrices, domestic or industrial liquid cleaners, metal working fluids, latex paints or other coating materials. It is an object of the invention to provide new or improved thickening systems for such products or for aqueous liquids for inclusion in such products or for other uses.

One type of material that may be used as a thickener for aqueous systems is represented by lipophilically-modified copolymers containing a hydrophilic chain. Such a copolymer thickener contains one or more hydrophilic chains, for example a polyoxyethylene chain, with or without other chain portions, and one or more lipophilic chains, for example a long chain alkyl group. One class of copolymer thickener is an aqueous emulsion thickener comprising one or more ethylenically unsaturated monomeric components, for example a carboxylic acid monomer and/or a nonionic vinyl monomer together with one or more nonionic vinyl polyoxyethylene components containing one or more lipophilic portions. References to emulsion copolymeric thickeners hereafter also include a reference to any solution-form of such thickener which may be entered on pH adjustment, as may be appropriate from the context.

U.S. Pat. No. 4,384,096 describes aqueous emulsion copolymers which are pH-responsive thickeners for aqueous systems. These copolymers comprise three components, namely a carboxylic acid monomer, a nonionic vinyl monomer and a nonionic vinyl surfactant ester which is a monoester containing a hydrophilic chain containing repeating ethylene oxide units and a lipophilic $C_8$–$C_{20}$ alkyl or $C_8$–$C_{16}$ alkylphenyl chain. The copolymer is stable as a colloidal dispersion at a pH lower than about 5.0 but becomes an effective thickener for aqueous systems on adjustment to a pH of about 5.5–10.5 or higher. It is noted in this document that, for a given polyethyleneoxide content in the lipophilically-modified vinyl surfactant ester, increasing the chain length of the terminal hydrophobic alkoxy or alkylphenoxy group in the surfactant ester will increase the efficiency of the resulting polymer as a thickener.

U.S. Pat. No. 4,514,552 describes an emulsion copolymer thickener comprising an $\alpha,\beta$-monoethylenically unsaturated carboxylic acid, a monoethylenically unsaturated monomer lacking surfactant capacity, and a nonionic urethane monomer which is the urethane reaction product of a monohydric nonionic surfactant with a monoethylenically unsaturated monoisocyanate. The monohydric nonionic surfactant portion of the copolymer is an ethoxylated hydrophobe containing adducted ethylene oxide to provide the hydrophilic portion of the molecule and a $C_6$ to $C_{22}$ alkyl group to provide the hydrophobic portion thereof. The emulsion copolymer thickener acts by increasing viscosity upon neutralization.

U.S. Pat. Nos. 4,663,385 and 4,429,097 describe broadly similar copolymeric thickening agents but in which the lipophilically-modified nonionic vinyl surfactant ester is a diester which can contain up to two terminal $C_8$ to $C_{30}$ groups or is a triester which can contain up to three terminal $C_8$ to $C_{30}$ groups.

In systems containing a high proportion of hydrophilic surfactant it is found that lipophilically-modified copolymer thickeners containing a hydrophilic chain, for example as described in the art referred to above, do not give their normal thickening behavior and, in fact, may even, in some instances at least, give a greatly decreased thickening effect with increased lipophilic chain length.

This phenomenon is generally corroborated in relation to certain copolymeric emulsion thickeners by the disclosures in U.S. Pat. Nos. 4,663,385 and 4,429,097. In these patents it is initially noted that the presence of a separate additional surfactant may give an enhancement of the thickening effect but that an optimum level of additional surfactant is reached, followed by a decrease as the surfactant level is further increased. The data in these patents show that a progressive improvement in the viscosity of an aqueous liquid is obtained when increasing amounts (0.025 to 0.15%, based on weight of the aqueous liquid) of a particular additional anionic surfactant are used but that there is thereafter a progressive decrease in viscosity. The viscosity becomes even lower than when no additional surfactant had been added at surfactant levels of 0.40% and above. At a level of the added surfactant of 0.50%, based on weight of the aqueous liquid, the viscosity obtained was greatly reduced in comparison with a liquid thickened only by the copolymer, with no added surfactant.

U.S. Pat. No. 5,916,967 describes the use of a combination of two surfactants of differing HLB values, as defined in that patent, together with a thickener to give an enhanced thickening effect. The surfactants are to have a weighted average HLB value of 15 or less. The patent teaches that "for weighted average HLB values greater than about 15, the enhanced thickening effect is believed to be negligible because the overall hydrophilicity of the surfactant combination nullifies any significant hydrophobic interaction between the surfactants and the associative thickener . . . " It is also seen from the Examples in the patent that, in the case of a thickening system containing one surfactant having a HLB value of 13.5, or containing a combination of surfactants having a weighted average HLB value of 13.5, the viscosity obtained was extremely low. In contrast, the present invention, described below, relates to the thickening of systems not only containing a high content of hydrophilic surfactant but also containing surfactants having a high HLB value above that taught in U.S. Pat. No. 5,916,967. The associative thickener used in U.S. Pat. No. 5,916,967 may be a hydrophobically-modified alkali-soluble emulsion copolymer, although the use of that thickener is not actually exemplified. The monomer components include a (meth) acrylic acid ester of an alkoxylated hydrocarbyl or complex hydrophobe alcohol in from 1 to 30%, preferably 0.5 to 25%, of the monomer content of the copolymer.

According to the present invention, described below, not only is the chain length of the hydrophobe of importance but also its quantity, that is the quantity of the lipophilically-modified component used in the copolymer.

STATEMENT OF INVENTION

The present invention provides an aqueous composition comprising (a) from 5 to 60 percent, based on weight of the aqueous composition, of one or more hydrophilic surfactant wherein the surfactant has an HLB value, or a weighted average HLB value, greater than 15; and (b) from 0.1 to 10 percent, based on weight of the aqueous composition, of lipophilically-modified copolymer selected from one or more of (i) uncrosslinked lipophilically-modified copolymer comprising a hydrophilic chain and 12 to 50 percent, based on weight of the uncrosslinked lipophilically-modified copolymer, of one or more lipophilically-modified component; and (ii) crosslinked lipophilically-modified copolymer comprising a hydrophilic chain, at least 5 percent of one or more lipophilically-modified component, and 0.01 to 2 percent of crosslinking agent, based on weight of the crosslinked lipophilically-modified copolymer.

In another embodiment, the present invention provides an aqueous composition comprising (a) from 10 to 50 percent, based on weight of the aqueous composition, of one or more hydrophilic surfactant wherein the surfactant has an HLB value, or a weighted average HLB value, greater than 15; and (b) from 0.2 to 5 percent, based on weight of the aqueous composition, of lipophilically-modified copolymer selected from one or more of (i) uncrosslinked lipophilically-modified copolymer comprising a hydrophilic chain and 15 to 40 percent, based on weight of the uncrosslinked lipophilically-modified copolymer, of one or more lipophilically-modified component; and (ii) crosslinked lipophilically-modified copolymer comprising a hydrophilic chain, 10 to 40 percent of one or more lipophilically-modified component, and 0.1 to 1 percent of crosslinking agent, based on weight of the crosslinked lipophilically-modified copolymer.

In a further embodiment, the present invention provides an aqueous composition in the form of a formulated composition selected from the group consisting of cosmetics, personal care products, laundry liquids, textile auxiliaries, emulsion and microemulsion formulations, cutting oils, printing pastes and cleaning formulations.

DETAILED DESCRIPTION

As used herein, the following terms have the designated definitions, unless the context clearly indicates otherwise. The term "copolymer" refers to polymer compositions containing units of two or more different monomers, including positional isomers. Unless otherwise specified, ranges listed are to be read as inclusive and combinable, temperatures are in degrees centigrade (° C.), and references to percentages (%) are by weight.

The aqueous compositions of the present invention typically contain at least 5%, typically from 5 to 60%, preferably from 10 to 50%, more preferably from 15 to 45% and most preferably from 20 to 40%, of hydrophilic surfactant, based on weight of the aqueous composition. The hydrophilic surfactant is preferably selected from the groups of anionic surfactants characterized by carboxylate, sulphonate, sulphate or phosphate solubilizing groups, and nonionic surfactants characterized by amide or hydroxyl groups or ethylene oxide chains. Hydrophilic cationic, amphoteric or zwitterionic surfactants may also or alternatively be used provided that they are compatible with the thickening copolymer and other ingredients of the aqueous system in the quantity required by the invention. Cationic surfactants characterized by amine or ammonium solubilizing groups, and/or amphoteric surfactants characterized by combinations of the anionic and cationic solubilizing groups may be selected.

Suitable hydrophilic surfactants include those having has an HLB (hydrophilic-lipophilic balance) value, or a weighted average HLB value, greater than 15, preferably greater than 20. It is understood that the weighted average HLB value will take into account all hydrophilic surfactant present in the aqueous composition, including those having individual HLB values greater than or less than 15. HLB is a value characterizing the relative proportions of hydrophilic and lipophilic portions of molecules; higher HLB values (those approaching 50) represent the more hydrophilic molecules and the lower HLB values (those around 6 to 10) represent the more hydrophobic molecules. HLB values may be calculated or determined by a variety of known procedures, such as those described in "Surfactants and Interfacial Phenomena" by Milton J. Rosen, John Wiley and Son, New York, N.Y., page 244 (1978) and "Interfacial Phenomena" by J. T. Davies and E. K. Rideal, Academic Press, 2nd Edition, pp 373–383 (1963).

Preferred hydrophilic surfactants for use in the practice of the invention may be selected from the $C_8$ to $C_{18}$ fatty acids or their water soluble salts, water soluble sulphates of $C_8$ to $C_{18}$ alcohols, sulphonated alkylaryl compounds such as, for example, dodecylbenzene sulphonate, alkylphenoxy polyethoxy ethanols, for example with $C_7$ to $C_{18}$ alkyl groups and 9 to 40 or more oxyethylene units, ethylene oxide derivatives of long chain carboxylic acids, for example of lauric, myristic, palmitic or oleic acids, ethylene oxide derivatives of long chain alcohols, for example of lauryl or cetyl alcohols, alkanolamides and polyglucosides, for example the alkyl polyglucosides. Suitable cationic hydrophilic surfactants may be, for example, lauryl pyridinium chloride, octylbenzyltrimethyl-ammonium chloride, dodecyl trimethylammonium chloride and ethylene oxide condensates of primary fatty acid amines.

The aqueous compositions of the present invention typically contain from 0.1 to 10%, preferably from 0.2 to 5% and more preferably from 0.4 to 3%, of lipophilically-modified copolymer, based on weight of the aqueous composition. The present invention will be described hereafter with particular reference to lipophilically-modified copolymers comprising two vinyl monomers and a lipophilically-modified hydrophilic chain but it is understood that this is by way of example and that the concept of the present invention extends to other lipophilically-modified copolymers containing a hydrophilic chain. The lipophilically-modified copolymers typically comprise a reaction product of one or more ethylenically mono-unsaturated monomers and a lipophilically-modified component. The amount of lipophilically-modified component in the lipophilically-modified copolymers refers to the amount of monomer used to incorporate the lipophilically-modified component into the lipophilically-modified copolymer, based on total weight of the lipophilically-modified copolymer.

The lipophilically-modified component or components of the lipophilically-modified copolymer used according to the invention may contain either one, or a plurality of, lipophilic groups. According to one embodiment, such groups are suitably in the same copolymer component as and attached to hydrophilic chains, such as for example polyoxyethylene chains. According to another embodiment, the lipophilically-modified copolymer may contain a vinyl group which may be used to copolymerize the polymer to other vinyl-containing entities to alter or improve the properties of the polymer. Alternatively other copolymerization systems may be used. The polymerizable group may be attached to the lipophilic group directly, or indirectly for example via one or more, for example up to 60, preferably up to 40, —CH[R]CH$_2$O— groups wherein R is $C_1$ or $C_2$ alkyl. Alternatively, the polymerizable group may be attached to the lipophilic group by reaction of the hydrophilic, for example polyoxyethylene, component with a urethane compound containing unsaturation. The molecular weight of the lipophilic-modifying group or groups is preferably selected together with the number of such groups to give the required minimum lipophilic content in the copolymer, and preferably, for satisfactory performance in a wide range of systems.

The amount of lipophilically-modified component in the lipophilically-modified copolymers useful in the present invention is typically at least 5% and up to 50% or more, preferably from 10 to 40%, more preferably from 12 to 30% and most preferably from 15 to 25%, based on weight of components of the copolymer, when the lipophilically-modified copolymer is a crosslinked copolymer, that is, containing from 0.01 to 2% crosslinking agent. When the lipophilically-modified copolymer is uncrosslinked, that is, prepared in the absence of crosslinking agent, the amount of lipophilically-modified component in the uncrosslinked lipophilically-modified copolymer is typically from 12 to 50%, preferably from 15 to 40% and more preferably from 15 to 25%, based on weight of components of the copolymer, The lipophilic-modifying groups themselves are preferably straight chain saturated alkyl groups, but may be aralkyl or alkyl carbocyclic groups such as alkylphenyl groups, having at least 6, and up to 30 carbon atoms although branched chain groups may be contemplated. It is understood that the alkyl groups may be either of synthetic or of natural origin and, in the latter case particularly, may contain a range of chain lengths. For example, naturally sourced stearic acid, even of commercially pure quality may contain only about 90% of stearic chains, up to about 7% of palmitic chains and a proportion of other chains and lower quality products may contain substantially less stearic acid. It is intended herein that reference to the chain length of such groups is to the predominant chain length which is present as more than 50%, preferably in more than 75%, of the chains.

It is an important subsidiary feature of the invention that the chain length of the lipophilic-modifying groups be minimized and the alkyl chain length, or predominant chain length, is typically below 22, preferably from 8 to 20, more preferably from 10 to 18 and most preferably from 10 to 16 carbon atoms. It is found that use of the shorter alkyl chains gives more efficient thickening although this does not apply to very short alkyl chains, that is, those below about 8 carbon atoms. The hydrophilic component of the lipophilically-modified copolymer may suitably be a polyoxyethylene component preferably comprising at least one chain of at least 2, preferably at least 5, and up to 60, preferably up to 40, ethylene oxide units. Such components are usually produced in a mixture of chain lengths.

In the practice of the invention the lipophilically-modified component is preferably attached directly or indirectly to a vinyl ester or to a mono-unsaturated urethane compound. However, the invention applies to aqueous emulsion copolymeric pH-responsive thickeners in which those or other unsaturated groups are attached to the lipophilic component so as to enable it to be polymerised into the copolymer.

The ethylenically unsaturated carboxylic acid monomer component of the copolymer, if present, may suitably be at least one mono-, di- or poly-carboxylic acid containing from 3 to 8 carbon atoms for example, acrylic acid, methacrylic acid, itaconic acid, acryloxypropionic acid, maleic acid, fumaric acid, citraconic acid or crotonic acid, and/or half- or part-esters of the di- or polycarboxylic acids with lower alkanols such as, for example, alkanols containing 1 to 4 carbon atoms preferably methacrylic acid, acrylic acid itaconic acid or acryloxypropionic acid. This monomer may suitably be present in at least 10% and up to 60% or more, preferably from 20 to 55%, based on weight of the copolymer.

The nonionic vinyl monomer component of the copolymer, if present, may suitably be at least one compound of the general formula:

wherein:

(a) Y is H and Z is —COOR'''', —C$_6$H$_4$R, —CN, —Cl, —OC(O)R'''', —CONH$_2$ or —CH═CH$_2$; or (b) Y is C$_1$–C$_4$ alkyl and Z is —COOR'''', —C$_6$H$_4$R''', —CN, —CONH$_2$ or —CH═CH$_2$; or (c) Y and Z are —Cl;

with: R'' being C$_1$–C$_8$ alkyl, C$_2$–C$_8$ hydroxyalkyl or lower alkoxy (C$_2$–C$_8$) alkyl;

R''' being —H, —Cl, —Br or C$_1$–C$_4$ alkyl; and

R'''' being C$_1$–C$_8$ alkyl.

The nonionic vinyl monomer is preferably a C$_1$–C$_4$ alkyl acrylate or methacrylate such as ethyl acrylate, butyl acrylate or methyl methacrylate. This monomer may suitably be present in at least 15% up to 80% or more, preferably from 25 to 60%, based on weight of the copolymer.

The lipophilically-modified copolymer may be a pH-responsive thickener. The pH-responsive copolymer thickener systems may be prepared by copolymerizing the monomers using known aqueous or inverse emulsification procedures at an acidic pH and any other suitable additives known in the art, for example, a free-radical initiator such as a peroxygen compound and, optionally, chain transfer agents. Suitable peroxygen compounds may be peroxides, hydroperoxides, persulphates or organic peroxides and a suitable quantity of initiator may be 0.01% to 3% by weight of the components of the copolymer. The copolymerization temperature may suitable be about 60° C. to 90° C. The copolymer emulsion may be recovered by filtration and the copolymer may, if desired, be provided in dry form by spray, drum or other drying. U.S. Pat. Nos. 4,384,096, 4,663,385, 4,429,097 and 4,514,552 may be consulted for further general and specific details of suitable copolymerization and recovery techniques, and of suitable monomers and additives. The molecular weight of uncrosslinked lipophilically-modified copolymer is typically in the range of about 100,000 to 1 million.

According to a preferred feature of the invention, the lipophilically-modified copolymer may be crosslinked, that is, a crosslinking agent, such as a monomer having two or more ethylenic unsaturated groups, is included with the copolymer components during polymerization. Examples of such monomers are diallyl phthalate, divinylbenzene, allyl methacrylate, diacrylobutylene or ethylene glycol dimethacrylate. When used, the amount of crosslinking agent is typically from 0.01% to 2%, preferably from 0.1 to 1% and more preferably from 0.2 to 0.8%, based on weight of the copolymer components.

It is a further preferred feature of the invention that the copolymer is prepared in the presence of a chain transfer agent when a crosslinking agent is used. Examples of suitable chain transfer agents are carbon tetrachloride, bromoform, bromotrichloromethane, long chain alkyl mercaptans and thioesters such as dodecyl-, octyl-, tetradecyl- or hexadecyl-mercaptans or butyl-, isooctyl- or dodecylthioglycolates. When used, the amount of chain transfer agent is typically from 0.01% to 5%, preferably from 0.1 to 1%, based on weight of the copolymer components. The crosslinking agent has been found to reduce thickening performance, which was unexpected. However, if the crosslinking agent is used in conjunction with a chain transfer agent, which are conflicting operations for polymerization purposes, not only is exceptional efficiency observed but also very high compatibility with hydrophilic surfactants, as manifested by increased product clarity.

Typical formulated compositions based on the aqueous compositions of the present invention include, for example, cosmetics, personal care products (such as shampoos, shower gels, body wash formulations, cleansing lotions, hair conditioners, hair dyes, hand lotions, hand creams, sunscreens, facial make-up, astringents, depilatories and antiperspirants), laundry liquids, textile auxiliaries, emulsion and microemulsion formulations, cutting oils, printing pastes and cleaning formulations.

Typical cleaning formulations based on the aqueous compositions of the present invention include, for example, metal cleaners, de-scalants, toilet bowl cleaners, household cleaners, automatic dishwash rinse agents, transportation cleaners, metal polishes, dairy cleaners, oven cleaners, grease cutting products, and liquid abrasive cleaners.

Additional applications include formulating the lipophilically-modified copolymers useful in the present invention with inorganic clay thickeners (for example, bentonite and lapinite) or natural thickeners (for example, alginates, guar, xanthan and gums) to provide aqueous compositions with high yield point for suspendiblity. Typically, 0.1 to 10 gram of inorganic or natural thickener is used per gram of lipophilically-modified copolymer.

*Formulating Detergents and Personal Care Products*, Louis Ho Tan Tai, AOCS Press, Champaign, Ill., USA (2000), may be consulted for further general and specific details of suitable end-use applications involving the aqueous compositions of the present invention.

It is understood that limited amounts of various additives and conventional adjuvants may be present as part of the aforementioned formulations as long as they do not negatively affect the performance or properties of the lipophilically-modified copolymer thickener. Such additives and adjuvants include, for example, proteins, synthetic oils, vegetable or animal oils, silicone oils, waxes, resins, gums, humectants, pigments, acidifying or alkalinizing agents, preservatives, dispersants, suspending agents, emollients, ($C_1$–$C_{20}$)alcohol solvents, sunscreen agents and perfumes.

Preparation of formulated compositions based on the aqueous compositions of the present invention is typically conducted by adding the required amount of lipophilically-modified copolymer to the formulated composition containing hydrophilic surfactant to achieve the desired thickening effects. The lipophilically-modified copolymer, in aqueous dispersion or in the dry form, may be blended into an aqueous system to be thickened followed, in the case of a pH-responsive thickener, by a suitable addition of acidic or basic material if required. In the case of the copolymeric pH-responsive thickeners described above, the pH of the system to be thickened is at, or is adjusted to, at least 6, preferably at least 7, and typically from about 8 up to 13 or more. The neutralizing agent is preferably a base such as sodium hydroxide or ammonium hydroxide. Alternatively, the copolymer may first be neutralized in aqueous dispersion and then blended. The hydrophilic surfactant, essentially present in at least 5% by weight of the system according to the invention, is preferably blended into a dispersion to be thickened separately from the copolymer and the combined dispersion neutralized.

Certain embodiments of the present invention will now be illustrated by reference to the following Examples but without limitation of the scope of the invention thereto. Example 1 is not according to the invention and is present for comparative purposes only. Examples 2 to 4 are according to the invention and illustrate the use of various hydrophilic surfactant levels, lipophilic group lengths and quantities and copolymer quantities designed to give approximately equal thickening within each Example in non-crosslinked copolymers. Those quantities are therefore a factor relevant to the thickening efficiency of the copolymer. Example 5 illustrates the use of crosslinked copolymers.

In the following Examples the following system was used. Samples were prepared of emulsion copolymers each containing a methacrylic acid monomer, an ethyl acrylate monomer and a nonionic vinyl ester polyoxyethylene component containing a lipophilic portion of synthetic origin consisting of either a $C_{12}$ (lauryl), a $C_{18}$ (stearyl) or a $C_{22}$ (behenyl) saturated alkyl chain and a polyoxyethylene oxide methacrylate chain containing from 15 to 30 ethylene oxide units. In some samples a crosslinking agent or a crosslinking agent and a chain transfer agent, were included. These copolymer samples were used in tests to thicken either water or water containing a hydrophilic surfactant (alkyl benzene sulphonate, calculated HLB value >25) at various levels of copolymer designed to give an approximately equivalent thickening effect within each set of tests, and at various surfactant concentrations. The thickening effect was measured using a Brookfield Viscometer at various rotation speeds from 0.6 to 60 rpm (revolutions per minute) with the results expressed in cPs (centipoise) and as a Pseudoplasticity Index (PS), which is the ratio between the Brookfield 0.6 rpm and 60 rpm viscosity figures. The results of the tests are summarized in the following Tables.

EXAMPLE 1

Absence of surfactant

TABLE 1

| Composition: | (a) | (b) | (c) | (d) |
|---|---|---|---|---|
| Alkyl chain - no. carbon atoms: | $C_{12}$ | $C_{18}$ | $C_{22}$ | $C_{18}$ |
| % Lip. modified component on copolymer: | 10 | 10 | 10 | 25 |
| Medium - Water(W) | W | W | W | W |
| % surfactant: | 0 | 0 | 0 | 0 |
| % by weight copolymer on total system: | 1.5 | 0.8 | 0.55 | 0.8 |
| Test No. Brookfield Viscosity at stated rpm | | | | |
| 1    0.6 | 24,000 | 184,000 | 136,000 | 117,000 |
| 2    3 | 18,800 | 42,800 | 33,400 | 27,800 |
| 3    6 | 15,500 | 22,300 | 17,500 | 14,800 |
| 4    12 | 12,000 | 12,050 | 9,200 | 8,200 |
| 5    30 | 8,540 | 5,700 | 4,100 | 3,680 |
| 6    60 | 6,300 | 2,900 | 2,280 | 2,010 |
| PS Index: | 5.3 | 63.4 | 59.6 | 58.2 |

The advantage of using a longer chain alkyl group in the absence of a surfactant is evident from the data set out above in that a lower quantity of polymer thickener by weight of the total system was required for equivalent performance. The PS Index was also significantly lower using the $C_{12}$ alkyl group indicating a low ratio of low-shear/high-shear viscosity. Often, a relatively high low-shear viscosity is desirable.

EXAMPLE 2

5% hydrophilic surfactant

TABLE 2

| Composition: | (a) | (b) | (c) | (d) | (e) |
|---|---|---|---|---|---|
| Alkyl chain - no. carbon atoms: | $C_{12}$ | $C_{18}$ | $C_{22}$ | $C_{18}$ | $C_{18}$ |
| % Lip. modified component on copolymer: | 10 | 10 | 10 | 18 | 25 |
| Medium - Water (W) % surfactant: | 5 | 5 | 5 | 5 | 5 |
| % by weight copolymer on total system: | 1.75 | 1.15 | 1.3 | 0.8 | 0.8 |
| Test No. | Brookfield Viscosity at stated rpm | | | | |
| 7 | 0.6 | 20,000 | 22,000 | 19,000 | 11,000 | 21,000 |
| 8 | 3 | 13,400 | 14,000 | 13,600 | 11,200 | 18,400 |
| 9 | 6 | 11,700 | 12,700 | 12,900 | 10,200 | 15,700 |
| 10 | 12 | 9,800 | 11,050 | 11,800 | 8,350 | 11,400 |
| 11 | 30 | 8,280 | 8,420 | 7,400 | 4,920 | 5,320 |
| 12 | 60 | 7,490 | 4,960 | 3,990 | 2,670 | 2,760 |
| PS Index: | | 2.7 | 4.4 | 4.9 | 4.1 | 7.6 |

The efficiency of the thickening copolymer, in terms of the quantity required to achieve a given viscosity, is found to be reduced overall in the presence of 5% by weight of the surfactant and the $C_{22}$ alkyl group is no longer the most efficient. The PS Index is of similar magnitude in all cases.

EXAMPLE 3

10% hydrophilic surfactant

TABLE 3

| Composition: | (a) | (b) | (c) | (d) | (e) |
|---|---|---|---|---|---|
| Alkyl chain - no. carbon atoms: | $C_{12}$ | $C_{18}$ | $C_{22}$ | $C_{18}$ | $C_{18}$ |
| % Lip. modified component on copolymer: | 10 | 10 | 10 | 18 | 25 |
| Medium - Water (W) % surfactant: | 10 | 10 | 10 | 10 | 10 |
| % by weight copolymer on total system: | 1.5 | 1.5 | 1.75 | 1.2 | 1.05 |
| Test No. | Brookfield Viscosity at stated rpm | | | | |
| 13 | 0.6 | 13,000 | 16,000 | 11,000 | 24,000 | 16,000 |
| 14 | 3 | 11,800 | 14,400 | 9,800 | 17,600 | 12,800 |
| 15 | 6 | 10,300 | 12,400 | 9,200 | 15,100 | 11,100 |
| 16 | 12 | 8,650 | 10,100 | 7,950 | 12,950 | 9,700 |
| 17 | 30 | 7,240 | 8,520 | 6,970 | 10,900 | 8,400 |
| 18 | 60 | 6,270 | 7,570 | 6,170 | 9,730 | 7,730 |
| PS Index: | | 2.1 | 2.1 | 1.8 | 2.5 | 2.1 |

The $C_{22}$ alkyl chain containing thickener was used in a larger quantity than the $C_{12}$ and $C_{18}$ thickeners but still gave a lower viscosity. The $C_{12}$ and $C_{18}$ thickeners gave a higher PS Index.

EXAMPLE 4

15% Hydrophilic Surfactant

TABLE 4

| Composition: | (a) | (b) | (c) | (d) | (e) |
|---|---|---|---|---|---|
| Alkyl chain - no. carbon atoms: | $C_{12}$ | $C_{18}$ | $C_{22}$ | $C_{18}$ | $C_{18}$ |
| % Lip. modified component on copolymer: | 10 | 10 | 10 | 18 | 25 |
| Medium - Water (W) % surfactant: | 15 | 15 | 15 | 15 | 15 |
| % by weight copolymer on total system: | 1.35 | 1.35 | 1.6 | 0.9 | 0.9 |
| Test No. | Brookfield Viscosity at stated rpm | | | | |
| 19 | 0.6 | 17,000 | 14,000 | 14,000 | 14,000 | 15,000 |
| 20 | 3 | 13,400 | 11,600 | 14,400 | 11,000 | 15,000 |
| 21 | 6 | 11,500 | 10,200 | 12,600 | 10,200 | 13,800 |
| 22 | 12 | 9,700 | 8,650 | 10,850 | 9,150 | 11,950 |
| 23 | 30 | 8,080 | 7,380 | 9,040 | 7,800 | 10,150 |
| 24 | 60 | 6,910 | 6,310 | 7,900 | 7,040 | 9,010 |
| PS Index: | | 2.5 | 2.2 | 1.8 | 2.0 | 1.7 |

At the higher surfactant concentrations illustrated in Tables 3 and 4 both the $C_{12}$ and the $C_{18}$ alkyl groups outperform the $C_{22}$ group and in Table 4 the $C_{12}$ group is shown to be the more efficient. In all of the Tables one or more series of tests are included using an increased concentration of the $C_{18}$ alkyl group in the polymer. In the absence of surfactant there appears to be a disadvantage in increasing the concentration of the alkyl group to 25%. In the presence of only 5% of surfactant a lower quantity of copolymer gives slightly reduced viscosities in most tests and no substantial advantage is seen in using the increased quantities of alkyl groups. In the presence of over 5%, for example 10% or 15%, of surfactant the advantage of using over 10%, for example 18 or 25%, of the alkyl group is clear.

EXAMPLE 5

15% hydrophilic surfactant/copolymer crosslinking

TABLE 5

| Composition: | (a) | (b) |
|---|---|---|
| Alkyl chain - no. carbon atoms: | $C_{18}$ | $C_{18}$ |
| % Lip. modified component on copolymer: | 30 | 30 |
| Crosslinking agent used: | yes | yes |
| Chain transfer agent used: | no | yes |
| Medium - Water(W) % surfactant: | 15 | 15 |
| % by weight copolymer on total system | 1.15 | 0.85 |
| Test No. | Brookfield Viscosity at stated rpm | |
| 25(a)–(b) | 0.6 | 16,000 | 10,000 |
| 26(a)–(b) | 3 | 12,400 | 10,600 |
| 27(a)–(b) | 6 | 10,900 | 10,300 |
| 28(a)–(b) | 12 | 9,950 | 9,100 |
| 29(a)–(b) | 30 | 8,700 | 8,080 |
| 30(a)–(b) | 60 | 7,860 | 7,200 |
| PS Index: | 2.0 | 1.4 |

The crosslinking agent was diallyl phthalate and the chain transfer agent was dodecyl mercaptan. Samples of thickener solutions containing increasing amounts of the above $C_{18}$ alkyl containing components and in each case 15% of the hydrophilic surfactant were tested for clarity by measuring their Optical Density at 545 nm (nanometers) using a spectrophotometer. The instrument was zeroed on a 15% surfactant solution containing no copolymer. The results are set out in Table 6.

EXAMPLE 6 crosslinking/chain transfer

TABLE 6

| % Lip. Mod. component | Copolymer crosslinked | Chain transfer agent used | Optical density |
|---|---|---|---|
| 10% | No | No | 0.129 |
| 18% | " | " | 0.197 |
| 25% | " | " | 0.093 |
| 30% | Yes | " | 0.144 |
| 30% | " | Yes | 0.011* |

*exceptional clarity as well as good efficiency.

I claim:

1. An aqueous composition comprising:
   (a) from 5 to 60 percent based on the weight of the aqueous composition, of one or more hydrophilic surfactant wherein the surfactant has an HLB (Hydrophilic-Lipophilic Balance) value, or a weighted average HLB (Hydrophilic-Lipophilic Balance) value, greater than 20; and
   (b) from 0.1 to 10 percent, based on the weight of the aqueous composition of lipophilically-modified copolymer selected from one or more of:
      (i) uncross-linked lipophilically-modified copolymer comprising a polyoxyethylene chain and 12 to 50 percent, based on the weight of uncross-linked lipophilically-modified copolymer, of one or more lipophilically-modified component; and
      (ii) cross-linked lipophilically-modified copolymer comprising a polyoxyethylene chain, at least 5 percent of one or more lipophilically-modified component, and 0.01 to 2 percent of cross-linking agent based on the weight of cross-linked lipophilically-modified copolymer;
   wherein the lipophilically-modified component comprises a copolymerizable vinyl ester or monoethylenically unsaturated urethane and further comprises one or more alkyl groups containing from 10 to 18 carbon atoms.

2. The composition of claim 1 wherein the uncrosslinked lipophilically-modified copolymer comprises from 15 to 40 percent of lipophilically-modified component.

3. The composition of claim 1 wherein the crosslinked lipophilically-modified copolymer comprises from 10 to 40 percent of lipophilically-modified component.

4. The composition of claim 1 wherein the lipophilically-modified copolymer comprises a reaction product of one or more ethylenically mono-unsaturated monomer and the lipophilically-modified component.

5. An aqueous composition comprising:
   (a) from 5 to 60 percent, based on the weight of the aqueous composition, of one or more hydrophilic surfactant wherein the surfactant has an HLB (Hydrophilic-Lipophilic Balance) value, or a weighted average HLB (Hydrophilic-Lipophilic Balance) value, greater than 20; and
   (b) from 0.1 to 10 percent, based on the weight of the aqueous composition, of lipophilically-modified copolymer selected from one or more of:
      a. uncross-linked lipophilically-modified copolymer comprising a polyoxyethylene chain and 12 to 50 percent, based on the weight of uncross-linked lipophilically-modified copolymer, of one or more lipophilically-modified component; and
      b. cross-linked lipophilically-modified copolymer comprising a polyoxyethylene chain, at least 5 percent of one or more lipophilically-modified component and 0.01 to 2 percent of cross-linking agent, based on the weight of cross-linked lipophilically-modified copolymer
   wherein the lipophilically-modified component comprises a copolymerizable vinyl ester or monoethylenically unsaturated urethane and further comprises one or more alkyl groups containing from 10 to 18 carbon atoms; and wherein the cross-linked lipophilically-modified copolymer has been prepared in the presence of a chain transfer agent.

6. The composition of claim 1 wherein the lipophilically-modified copolymer is a pH-responsive thickener.

7. The composition of claim 1 wherein the composition is in the form of a formulated composition selected from the group consisting of cosmetics, personal care products, laundry liquids, textile auxiliaries, emulsion and microemulsion formulations, cutting oils, printing pastes and cleaning formulations.

8. An aqueous composition comprising:
   (a) from 10 to 50 percent, based on the weight of the aqueous composition, of one or more hydrophilic surfactant wherein the surfactant has an HLB (Hydrophilic-Lipophilic Balance) value, or a weighted average HLB (Hydrophilic-Lipophilic Balance) value, greater then 20; and
   (b) from 0.2 to 5 percent, based on the weight of the aqueous composition, of lipophilically-modified copolymer selected from one or more of:
      (i) uncross-linked lipophilically-modified copolymer comprising a polyoxyethylene chain and 15 to 40 percent, based on the weight of uncross-linked lipophilically-modified copolymer, of one or more lipophilically-modified component; and
      (ii) cross-linked lipophilically-modified copolymer comprising a polyoxyethylene chain, 10 to 40 percent of one or more lipophilically-modified component, and 0.01 to 1 percent of cross-linking agent, based on the weight of cross-linked lipophilically-modified copolymer;
   wherein the lipophilically-modified component comprises a copolymerizable vinyl ester or monoethylenically unsaturated urethane and further comprises one or more alkyl groups containing from 10 to 18 carbon atoms; and wherein the cross-linked lipophilically-modified copolymer has been prepared in the presence of a chain transfer agent.

* * * * *